United States Patent
Chiu et al.

(10) Patent No.: US 8,213,351 B2
(45) Date of Patent: Jul. 3, 2012

(54) RELAY STATION AND COMMUNICATION METHOD THEREOF

(75) Inventors: Pi-Chen Chiu, Hsinchu (TW); Tzu-Jane Tsai, Zhubei (TW); Kun-Nan Tseng, Beigang Township (TW); Yuan-Ching Tseng, Taoyuan (TW)

(73) Assignee: Industrial Technology Research Institute (TW)

( * ) Notice: Subject to any disclaimer, the term of this patent is extended or adjusted under 35 U.S.C. 154(b) by 486 days.

(21) Appl. No.: 12/477,879

(22) Filed: Jun. 3, 2009

(65) Prior Publication Data
US 2010/0165911 A1 Jul. 1, 2010

(30) Foreign Application Priority Data
Dec. 30, 2008 (TW) ................................ 97151379 A (51) Int. Cl.
*H04B 7/14* (2006.01)
(52) U.S. Cl. ........................................ 370/315; 370/328
(58) Field of Classification Search .................. None
See application file for complete search history.

(56) References Cited

U.S. PATENT DOCUMENTS

| | | | |
|---|---|---|---|
| 2008/0080436 A1 | 4/2008 | Sandhu et al. | |
| 2008/0085677 A1 | 4/2008 | Sheen et al. | |
| 2008/0090585 A1 | 4/2008 | Hart et al. | |
| 2008/0165776 A1* | 7/2008 | Tao et al. | 370/392 |
| 2008/0219203 A1* | 9/2008 | Chou et al. | 370/315 |
| 2009/0003337 A1* | 1/2009 | Daines et al. | 370/389 |
| 2009/0016259 A1* | 1/2009 | Zhang et al. | 370/315 |
| 2009/0190522 A1* | 7/2009 | Horn et al. | 370/315 |
| 2010/0039935 A1* | 2/2010 | Davison et al. | 370/228 |
| 2011/0038284 A1* | 2/2011 | Senarath et al. | 370/279 |

FOREIGN PATENT DOCUMENTS
WO 2007019672 2/2007

OTHER PUBLICATIONS

Debalina Ghosh et al.; "Admission control and interference-aware scheduling in Multi-hop WiMAX networks"; IEEE; 2007; 9 pages.
Yang Yu et al.; "Planning Base Station and Relay Station Locations in IEEE 802.16j Multi-hop Relay Networks"; IEEE CCNC; 2008; pp. 922-926.
Ji Hyun Park et al.; "Reducing inter-cell handover events based on Cell ID information in multi-hop Relay Systems"; IEEE; 2007; pp. 743-747.
I-Kang Fu et al.; "Deployment and radio resource reuse in IEEE 802.16j multi-hop relay network in Manhattan-like environment"; IEEE ICICS; 2007; 5 pages.

* cited by examiner

*Primary Examiner* — Min Jung
(74) *Attorney, Agent, or Firm* — Lowe Hauptman Ham & Berner, LLP (57) ABSTRACT

An embodiment of a relay station for a base station and a mobile station is provided. The relay station includes a first base station module and a mobile station module. The first base station module receives a control packet and a data packet transmitted by a mobile station. The mobile station module receives and transmits the control packet and the data packet to the base station, wherein the first base station module transmits the control packet to the mobile station module via a tunnel mode, and transmits the data packet to the mobile station module via a bridge mode.

33 Claims, 9 Drawing Sheets

RELAY STATION AND COMMUNICATION METHOD THEREOF

CROSS REFERENCE TO RELATED APPLICATIONS

This Application claims priority of Taiwan Patent Application No. 97151379, filed on Dec. 30, 2008, the entirety of which is incorporated by reference herein.

BACKGROUND

1. Technical Field

The disclosure relates to a relay station and communication method thereof.

2. Description of the Related Art

IEEE 802.16 is a major wireless technology standard because of high bandwidth, high mobility and good link quality. However, there still exist technical drawbacks in the IEEE 802.16 standard, such as the coverage holes between base stations, and the bad signal quality at the edge of cell of the base station.

BRIEF SUMMARY

An embodiment of a relay station for a base station and a mobile station is provided. The relay station comprises a first base station module and a mobile station module. The first base station module receives a control packet and a data packet transmitted by a mobile station. The mobile station module receives and transmits the control packet and the data packet to the base station, wherein the first base station module transmits the control packet to the mobile station module via a tunnel mode, and transmits the data packet to the mobile station module via a bridge mode.

Another embodiment of a wireless communication system is provided. The system comprises a mobile station, an access service network server, a tunnel/dispatch unit, a base station to connect to the access service network server, and a relay station. The relay station comprises a first base station module and a mobile station module. The first base station module receives a control packet and a data packet transmitted by a mobile station. The mobile station module receives and transmits the control packet and the data packet to the base station, wherein the first base station module transforms the control packet into a first control packet via a tunnel mode, the first base station module transmits the data packet to the mobile station module via a bridge mode, and when the tunnel/dispatch unit receives the first control packet, the tunnel/dispatch unit transforms the first control packet into the control packet, and transmits the control packet to the access service network server.

An embodiment of a wireless communication method is provided. The method comprises: applying a network entry procedure on a relay station to network connect the relay station and an access service network module; and authenticating a mobile station by the relay station and the relay station network connecting the relay station, wherein when the mobile station transmits a control packet to the access service network module, the relay station operates in a tunnel mode, and transmits a first control packet to the access service network module after the control packet is transformed into the first control packet, and when the mobile station transmits a data packet to the access service network module, the relay station operates in a bridge mode to directly transmit the data packet to the access service network module.

A detailed description is given in the following embodiments with reference to the accompanying drawings.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
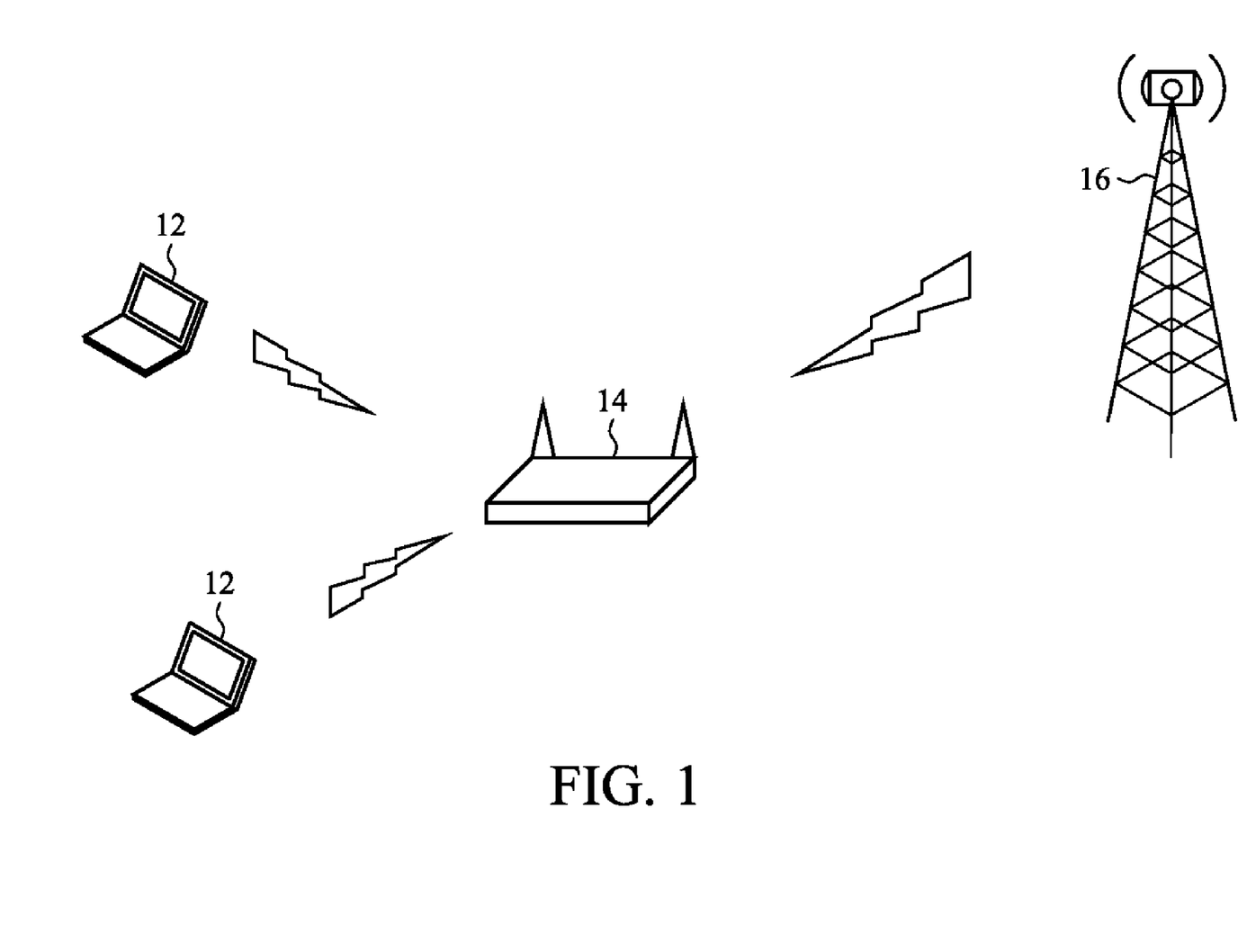
FIG. 1 is a schematic diagram of a wireless communication system according to an exemplary embodiment consistent with the invention.

FIG. 1 is a schematic diagram of a wireless communication system according to an exemplary embodiment consistent with the invention. The wireless communication system described herein uses the Worldwide Interoperability for Microwave Access (WIMAX) as an example. The mobile station (MS) 12 is connected to the relay station 14 via the wireless network. In FIG. 1, the relay station 14 executes a network entry procedure to connect to the base station (BS) 16. After the relay station 14 networks connect to the base station 16, the mobile station 12 connects to the base station 16 via the relay station 14.

Figure 2:
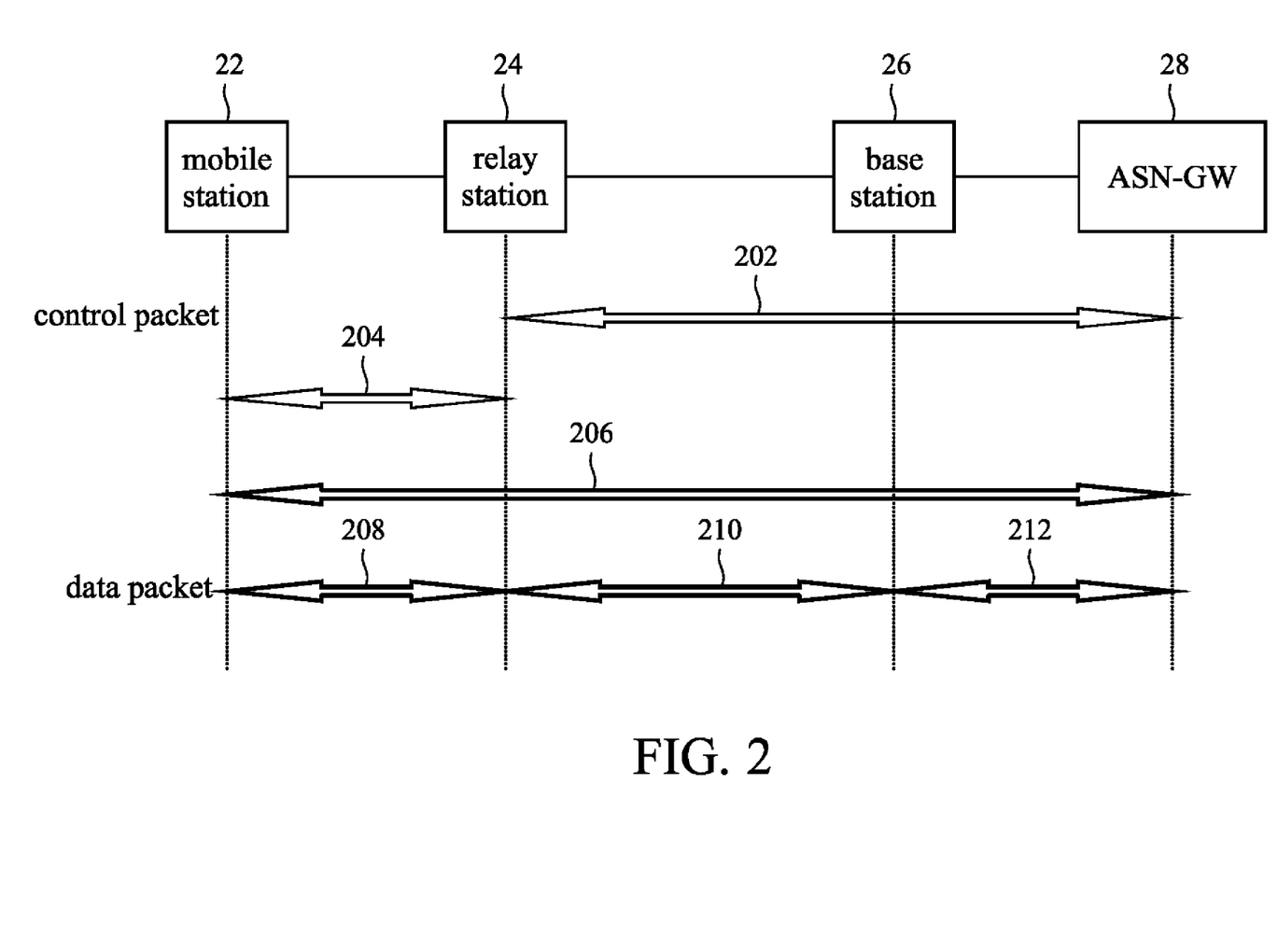
FIG. 2 is a schematic diagram of an embodiment of a wireless communication system according to an exemplary embodiment consistent with the invention.

FIG. 2 is a schematic diagram of an embodiment of a wireless communication system according to an exemplary embodiment consistent with the invention. FIG. 2 shows connections of the relay station 24 between the network, the corresponding transmission of the control packet and data packet. The relay station 24 executes a network entry procedure 202 via the base station 26 and the access service network gateway (ASN-GW) 28. When the relay station 24 is authenticated to enter the network, the mobile station 22 executes a ranging procedure 204. Then, the mobile station 22 executes an authentication and IP addressing procedure 206 via the relay station 24 and ASN-GW 28. After the procedure 206 is finished, the mobile station 22 is authenticated to enter the network. In this embodiment, the mobile 22 is authenticated by the relay station 24, and the ASN-GW 28 does not have to authenticate the mobile station 22. The ASN-GW only recognizes whether the packet is from the relay station 24, and if yes, the received control packet can be directly transmitted via the network. In another embodiment, the ASN-GW 28 also authenticates the mobile station 22, and executes an account management or billing procedure.

In the embodiment, when transmitting data packets, the mobile station 22 first transmits the data packets to the relay station 24 via the network 208, such as IEEE 802.16 networks. Then, the relay station 24 transmits the data packets to the base station 26 via the network 210, such as IEEE 802.16 networks. Lastly, the base station 26 and ASN-GW 28 transmit the data packets to the internet via the IP network 212. In the embodiment, the packets transmitted to the relay station 24 comprise control packets and data packets, wherein the control packets are transmitted by IP tunneling, and the data packets are transmitted under a bridge mode.

Figure 3:
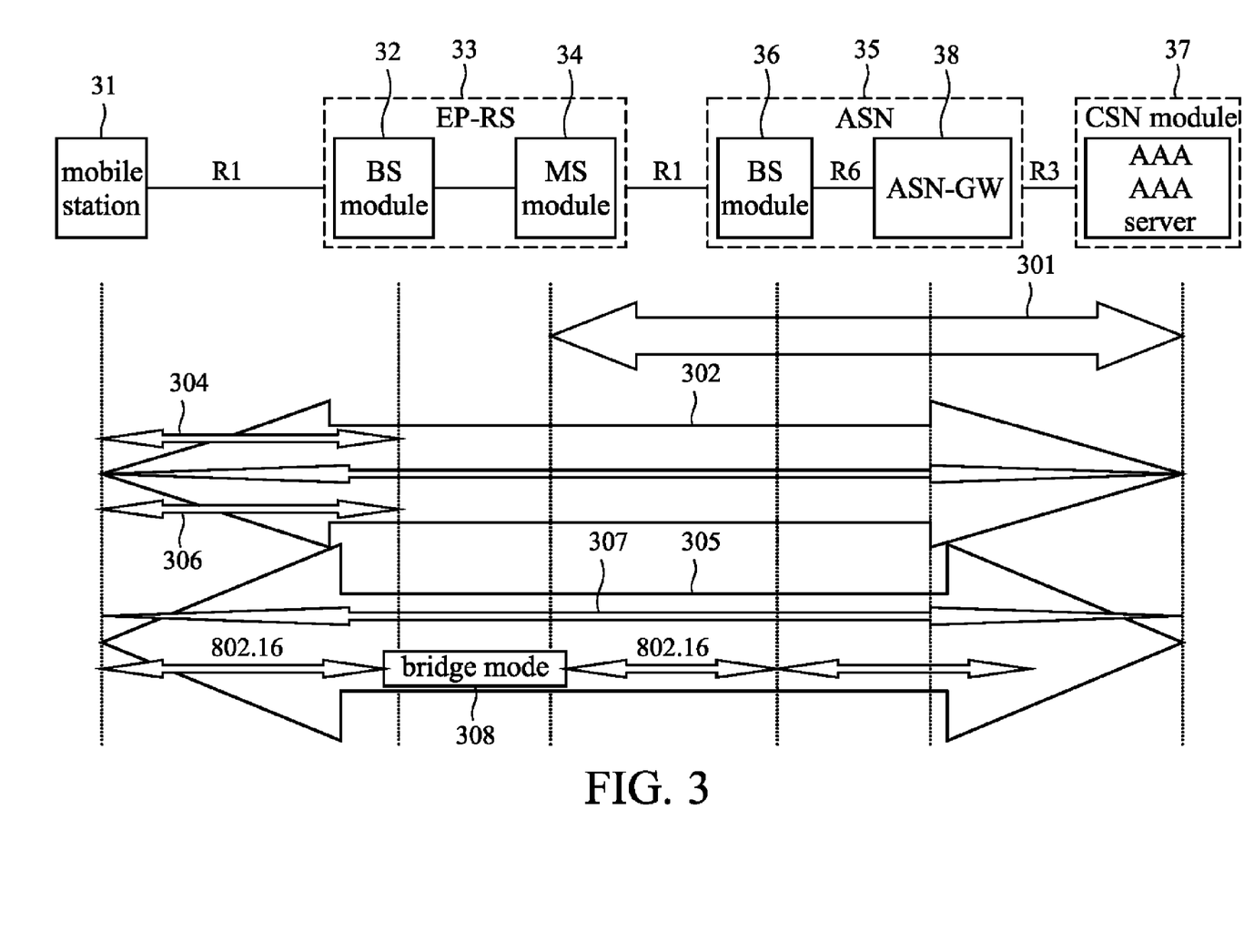
FIG. 3 is a schematic diagram of an embodiment of a wireless communication system according to an exemplary embodiment consistent with the invention.

FIG. 3 is a schematic diagram of an embodiment of a wireless communication system according to an exemplary embodiment consistent with the invention. In this embodiment, the easy-placement relay station (EP-RS) 33 comprises a BS module 32 with ASN-GW and a MS module 34. When the EP-RS 33 is activated, the EP-RS 33 executes a network entry procedure 301 complying with the IEEE 802.16 standard with the BS module 36 and ASN-GW 38 in the access service network module (ASN) 35, and authentication, authorization, and accounting (AAA) server and dynamic host configuration protocol (DHCP) server in the connectivity service network (CSN) module 37. When the EP-RS 33 is successfully authenticated and acquires an IP address, the EP-RS 33 can provide services to the mobile station 31.

Since the EP-RS 33 provides services to the mobile station 31, the EP-RS 33 executes a series of handshaking procedures 304 with the mobile station 31, wherein the handshaking procedure comprises a ranging procedure, After the handshaking procedures 304 are finished, the EP-RS 31 can recognize the mobile station 31. Then, the EP-RS 33 transmits the control packets from the mobile station 31 to the CSN module 47 via a tunneling mode and executes an extensible authentication protocol (EAP) procedure via the AAA server in the CSN module 37. After the mobile station 31 is successfully authenticated, the mobile station exchanges the PKM messages with the EP-RS 33 to complete a register procedure 306 with the ASN-GW in the BS module 32 of the EP-RS 33.

When the mobile station 31 wants to transmits data to the internet, the EP-RS 33 operates under a bridge mode 308. The MS module 34 of the EP-RS 33 requests an IP address from the DHCP server in the CSN module 37, and then the EP-RS 33 transmits the data from the mobile station 31 via the IP address to the internet. In this embodiment, the bridge mode indicates that the BS module 32 of the EP-RS 33 is simulated as an access point (AP) to receive the data from the mobile station 31. Then, the received data is directly transmitted to the MS module 34 and then to the base station 26.

In this embodiment, the mobile station 31 communicates with the EP-RS 33 via a wireless communication method complying with the IEEE 802.16 standard, the EP-RS 33 communicates with the ASN 35 also via a wireless communication method complying with the IEEE 802.16 standard, and the communication between the ASN 35 and the CSN module 37 may be implemented via a wireless network, a local area network (LAN) or other similar way.

Figure 4:
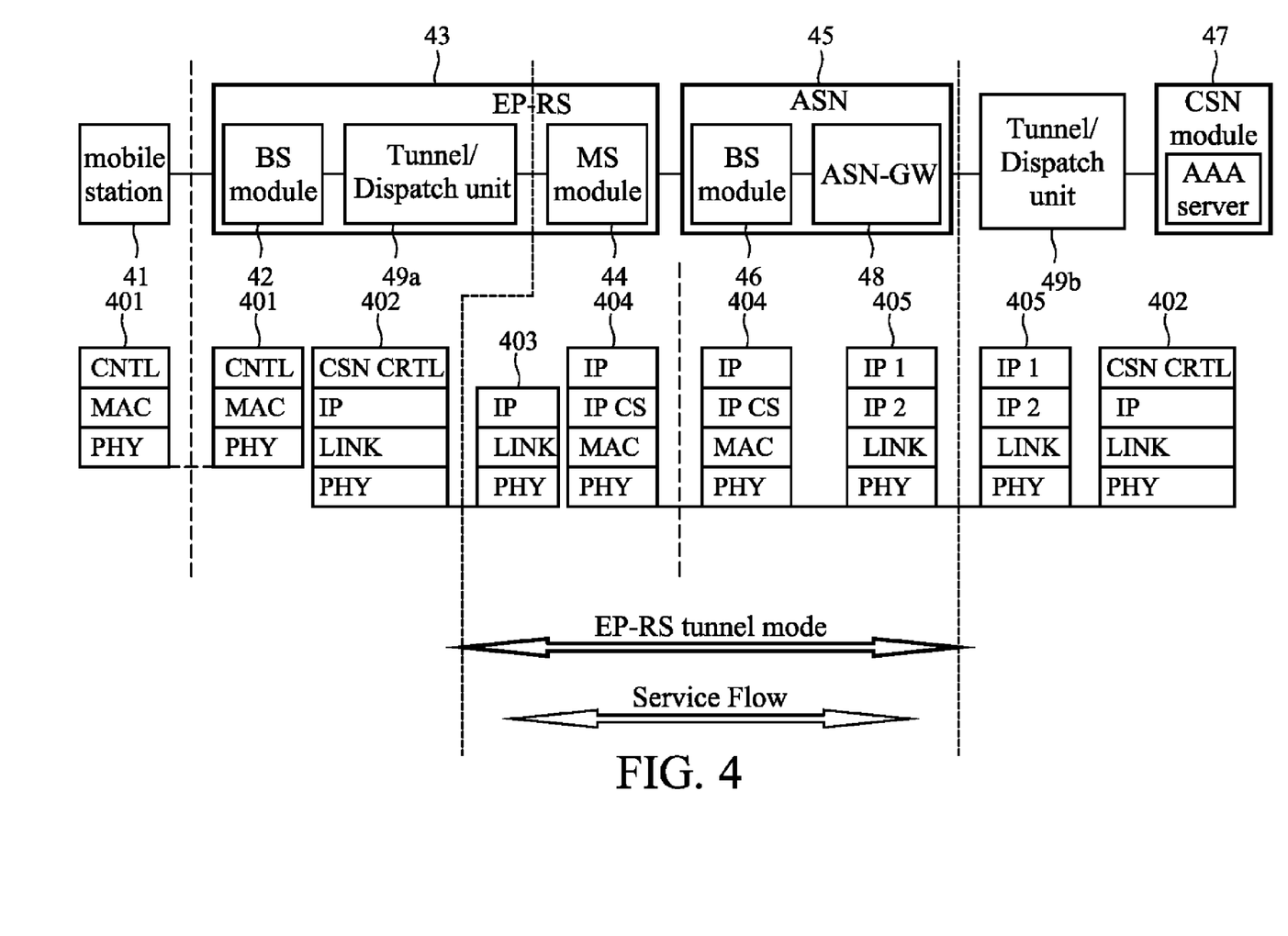
FIG. 4 is a schematic diagram showing an embodiment of control packet transmission according to the wireless communication system.

FIG. 4 is a schematic diagram showing an embodiment of control packet transmission according to the wireless communication system. In this embodiment, the easy-placement relay station (EP-RS) 43 comprises a BS module 42 with ASN-GW, a MS module 44, and a tunnel/dispatch unit 49*a*. In this embodiment, the tunnel/dispatch unit 49*a* adds the IP address of the EP-RS 43 to the received control packet or removes the IP address of the EP-RS 43 from the received control packet. The tunnel/dispatch unit 49*b* adds the IP address of the EP-RS 43 to the received control packet which is output from ASN 45 or removes the IP address of the EP-RS 43 from the received control packet which is output from ASN 45.

The EP-RS 43 first executes a network entry procedure to enter the WiMAX network to get an IP address. The EP-RS 43 establishes a best service flow (BE flow) with the ASN-GW 48 to transmits the control packet from the mobile station 41 to the CSN module 47, wherein the mobile station 41 is network connected to the EP-RS 43, and the function of the BE flow is similar to the function of an initial service flow (ISF). Because the default value of the ISF in WiMAX standard is BE, the system accordingly sets the quality of signal (QoS) of the initial service flow as BE. After that, a network entrance procedure for the mobile station 41 is executed. As described, the mobile station 41 executes a ranging procedure with the EP-RS 43 and exchanges the SBC and PKM information with the EP-RS 43. Then, an EAP procedure is transmitted to the AAA server of the CSN module 47 through the BE service flow established by the EP-RS 42 via the tunneling mode. Therefore, before the control packet enters the MS module 44 of the EP-RS 43, the tunnel/dispatch unit 49*a* packages the control packet so that the control packet can be recognized by the MS module 44 of the EP-RS 43. Then, the packaged control packet is transmitted as a common data packet. When the tunnel/dispatch unit 49*b* receives the packaged control packet, the tunnel/dispatch unit 49*b* dispatches the packaged control packet and transmits the control packet to the AAA server of the CSN module 47. When the mobile station 41 is authorized, the mobile station 41 executes a PKM procedure and a register procedure with the BS module of the EP-RS 43. Then, the mobile station 41 acquires the IP address from the DHCP of CSN module 47 via the bridge mode of the EP-RS 43 to complete the network entry procedure.

The following is a detailed description of an embodiment of wireless communication transmission. The mobile station 41 transmits data 401 to the EP-RS 43 and the data 401 is illustrated with only partial parameters, which does not limit the invention. When the data is transmitted between the mobile station 41 and tunnel/dispatch unit 49*a*, the transmission of the data is the same as the transmission of the control information, i.e., the transmission in the control plane. When the BS module 42 receives the data 401, the BS module 42 generates a corresponding data 402 via the built-in ASN-GW and transmits the data 402 to the tunnel/dispatch unit 49*a* to generate data 403. In the data 402, IP is the ip address of the mobile station 41. The tunnel/dispatch unit 49*a* adds the IP address of the mobile station 41 to the pay load of the data 403 (not shown in Figure), and the IP of the data 403 indicates the IP address of the MS module 44. When the data is transmitted between the MS module 44 and the ASN 45, the transmission of the data is the same as the transmission of the data packet, i.e., the transmission in the data plane.

The IP of the data 404 indicates the IP address of the MS module 44. The ASN 45 receives data 404 to generate data 405 including IP1 and IP2, wherein IP1 is the IP address of the mobile station 41 and IP2 is the IP address of MS module 44. The IP address of the mobile station 41 is stored in the payload of the data 404 and 405. The tunnel/dispatch unit 49b receives and dispatches the data 405 to acquire the IP address of the mobile station 41 stored in the payload of the data 405. The destination address in the data 402 is the address of AAA server of the CSN module 47, and the data 402 is transmitted to the AAA module for further processing.

The tunnel/dispatch unit 49b removes the IP address of EP-RS 33 to generate the data 402. Thus, the CSN module 47 can receive the control information or control packet from the mobile station. In this embodiment, the message transmission between the tunnel/dispatch unit 49a and the tunnel/dispatch unit 49b is the same as the data transmission of 802.16 standards, and not the conventional control information transmission mechanism.

Figure 5:
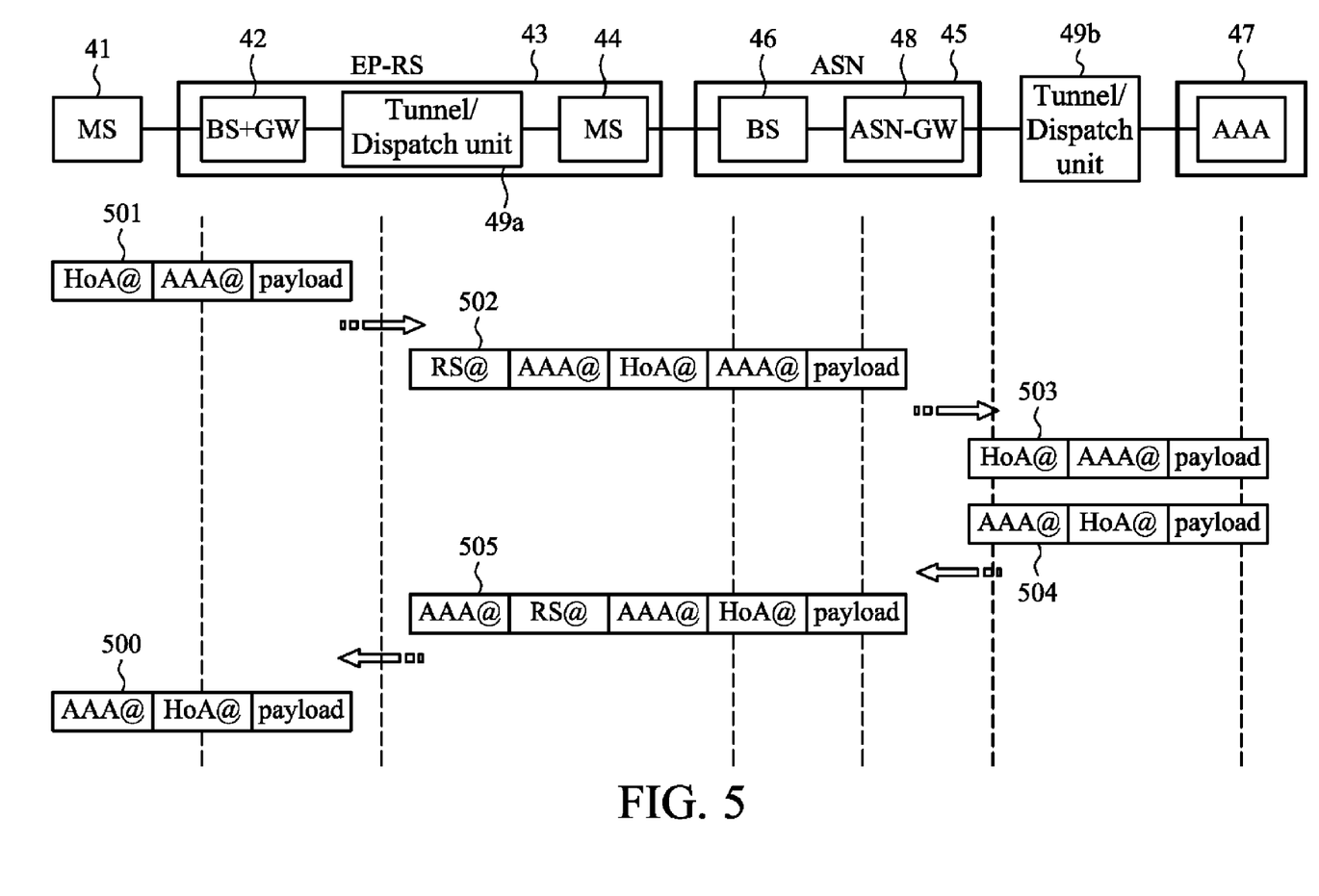
FIG. 5 is a schematic diagram showing the transformation of a control packet in the EP-RS 43.

FIG. 5 is a schematic diagram showing the transformation of a control packet in the EP-RS 43. The source address of the control packet 501 is the address of the mobile station 41, HoA@, the destination address is the address of the CSN module 47, AAA@, and the control information transmitted is a payload. When the EP-RS 43 receives the control packet 501, the tunnel/dispatch unit 49a modifies the control packet 501 to add the address RS@ and AAA@ to the control packet to indicate that the control packet has been authenticated by the EP-RS 43. Thus, the control packet has been transmitted by the EP-RS 43 and the destination is the CSN module 47. In this embodiment, the ASN 45 only recognizes the addresses of the EP-RS 43 and the CSN module 47, and cannot recognize the address of the mobile station 41. The tunnel/dispatch unit 49b receives the data 502 and generates the control packet 503 originally output by the mobile station 41. In this embodiment, the tunnel/dispatch unit 49b has to build a table of the address RS@ of the EP-RS 41 and the address of the corresponding HoA@ of the mobile station 41, so that the CSN module 47 can recognize that the control packet has been output by which mobile station and transferred by which EP-RS.

When the CSN module 47 transmits a control packet 504 to the mobile station 41, the source address of control packet 504 is the address of the CSN module 47, AAA@, the destination address is the address of the mobile station 41, HoA@, and the control information transmitted is a payload. The tunnel/dispatch 49b determines which EP-RS is used to transmit the control packet 504 according to the address of the mobile station 41, HoA@. Thus, the data packet 505 is authenticated by the EP-RS 43, output by the CNS module 47 and the destination is the EP-RS 43. When receiving the packet, the tunnel/dispatch unit 49a transforms the data packet 505 to the packet 500 and transmits the packet 500 to the mobile station 41 via the BS module 42.

Figure 6:
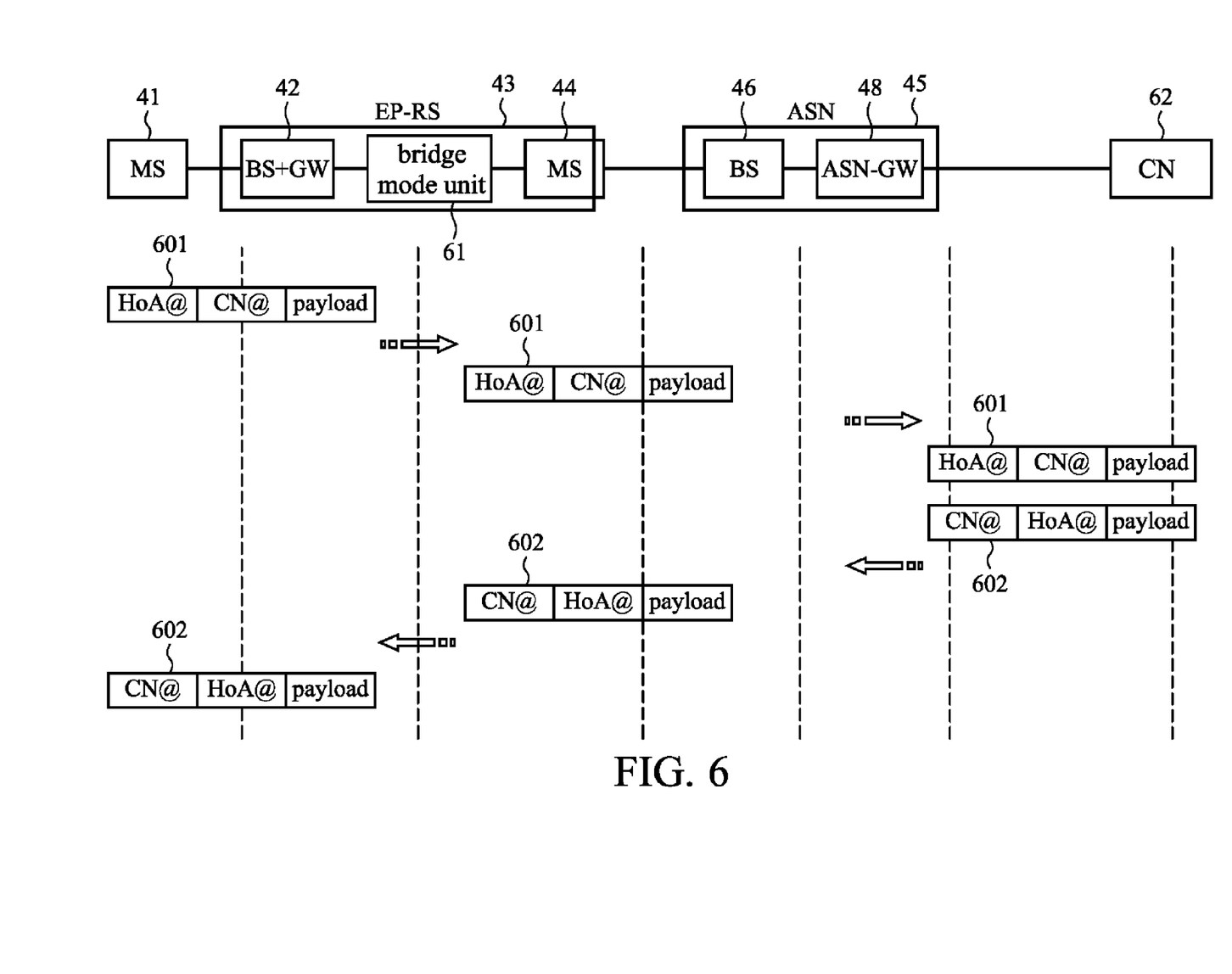
FIG. 6 is a schematic diagram showing an embodiment of data packet transmission according to the wireless communication system.

FIG. 6 is a schematic diagram showing an embodiment of data packet transmission according to the wireless communication system. When the mobile station transmits a data packet 601 to a corresponding node (CN) 62, the EP-RS 43 directly transfers the data packet 601 to the ASN 45 via a built-in bridge mode unit 61, wherein the CN 62 may be a node or a computer in the network, and the bridge mode unit 61 may be a transmission path, transmission control unit or module. In this embodiment, the bridge mode unit 61 is a transmission type which is implemented by the BS module 42 with a built-in ASN-GW. The source address of the data packet 601 is the address of the mobile station 41, H0A@, the destination address of the data packet 601 is the address of CN 62, CN@, and the transmitted data is labeled as data. Since the EP-RS 43 operates at a bridge mode, the EP-RS 43 directly transfers the data packet 601 to the ASN 45. The ASN 45 transmits the data packet 601 to the corresponding node 62 according to the address CN@ without advanced authentication because the mobile station 41 has been authenticated by the EP-RS 43.

Before the corresponding node 62 transmits the data packet 602 to the mobile station 41, the ASN 45 first transmits the data packet 602 to the corresponding EP-RS 43 according to the destination address HoA@ of the data packet 602. When the MS module 44 of the EP-RS 43 receives the data packet 602, the data packet 602 is transmitted to the BS module 42 via the bridge mode unit 61, and then is transmitted to mobile station 41.

Figure 7:
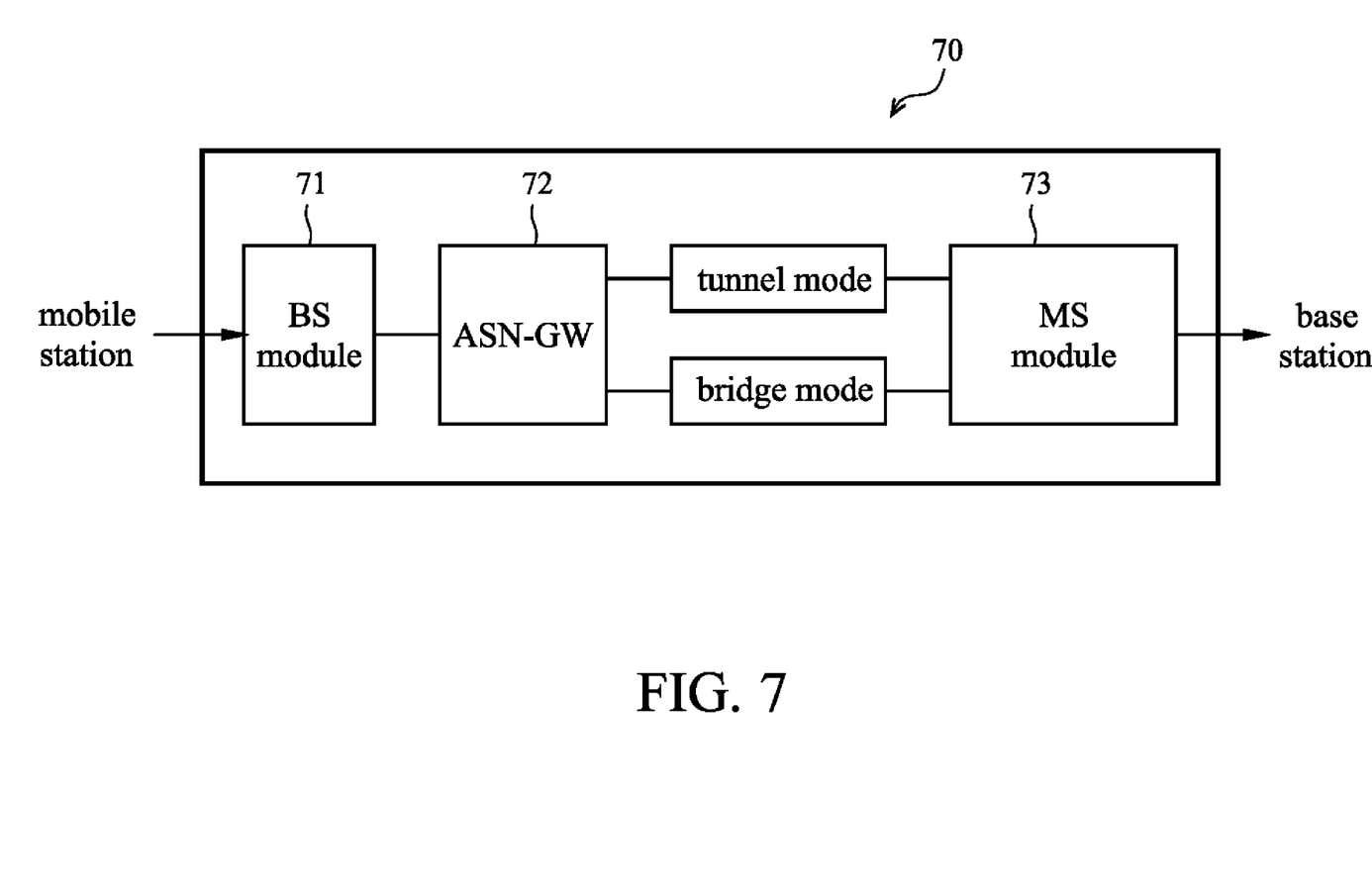
FIG. 7 is a block diagram of an embodiment of a relay station according to an exemplary embodiment consistent with the invention.

FIG. 7 is a block diagram of an embodiment of a relay station according to an exemplary embodiment consistent with the invention. When the BS module 71 receives a messenger from a mobile station, the ASN-GW 72 authenticates the mobile station. After authentication, the BS module 71 allocates a service flow to the mobile station according to the service flow identification (SFID) of the mobile station by a service flow management module. Although, the mobile station is authenticated by the ASN-GW 72, it is noted that when the mobile station executes a network entry procedure, the mobile station still has to be authenticated by the DHCP server, and acquires an IP address therefrom. The network entry procedure typically comprises the following steps:

1. The mobile station scans all the downlink channels and synchronizes with the base station.
2. The mobile station acquires the parameters from the base station.
3. The mobile station executes a ranging procedure.
4. The mobile station communicates with the base station for basic authorization.
5. The base station authenticates the mobile station and exchanges the keys.
6. The mobile station registers at the base station.
7. An IP connection is built between the mobile station and the base station.
8. Thus due to step 7, a network connection is built between the mobile station and the base station.

When executing the above steps, WiMAX provides a specific initial service flow (ISF) for the mobile station because the mobile station has yet to acquire the IP address.

When the BS module 71 identifies the service flow used by the mobile station, the ASN-GW 72 executes a service flow authorization process to the control packet or the data packet transmitted from the mobile station. After the packets are authorized, the control packet or the data packet thus can be transmitted to the base station network connected by the relay station 70 via the MS module 73. When the BS module 71 receives the data packet, the BS module 71 transmits the data packet to the MS module of the relay station 70 via a bridge mode. When the BS module 71 receives the control packet, the BS module 71 transmits the data packet to the MS module of the relay station 70 via a tunneling mode. In the tunneling mode, the relay station 70 adds the address of the relay station 70 to the control packet and then transmits the processed control packet to the corresponding base station.

In this embodiment, the relay station 70 provides services to the mobile station compatible with the IEEE 802.16 standard, thus, the BS module 71 is accordingly compatible with the IEEE 802.16 standard. Moreover, the MS module 73 is not limited to be compatible with the IEEE 802.16 standard.

In this embodiment, the ASN-GW comprises a built-in processing unit. The network services provider can apply a network bill procedure or a network usage time-counting procedure to individual mobile stations. Furthermore, the provider can also manage the account of the mobile stations.

Figure 8:
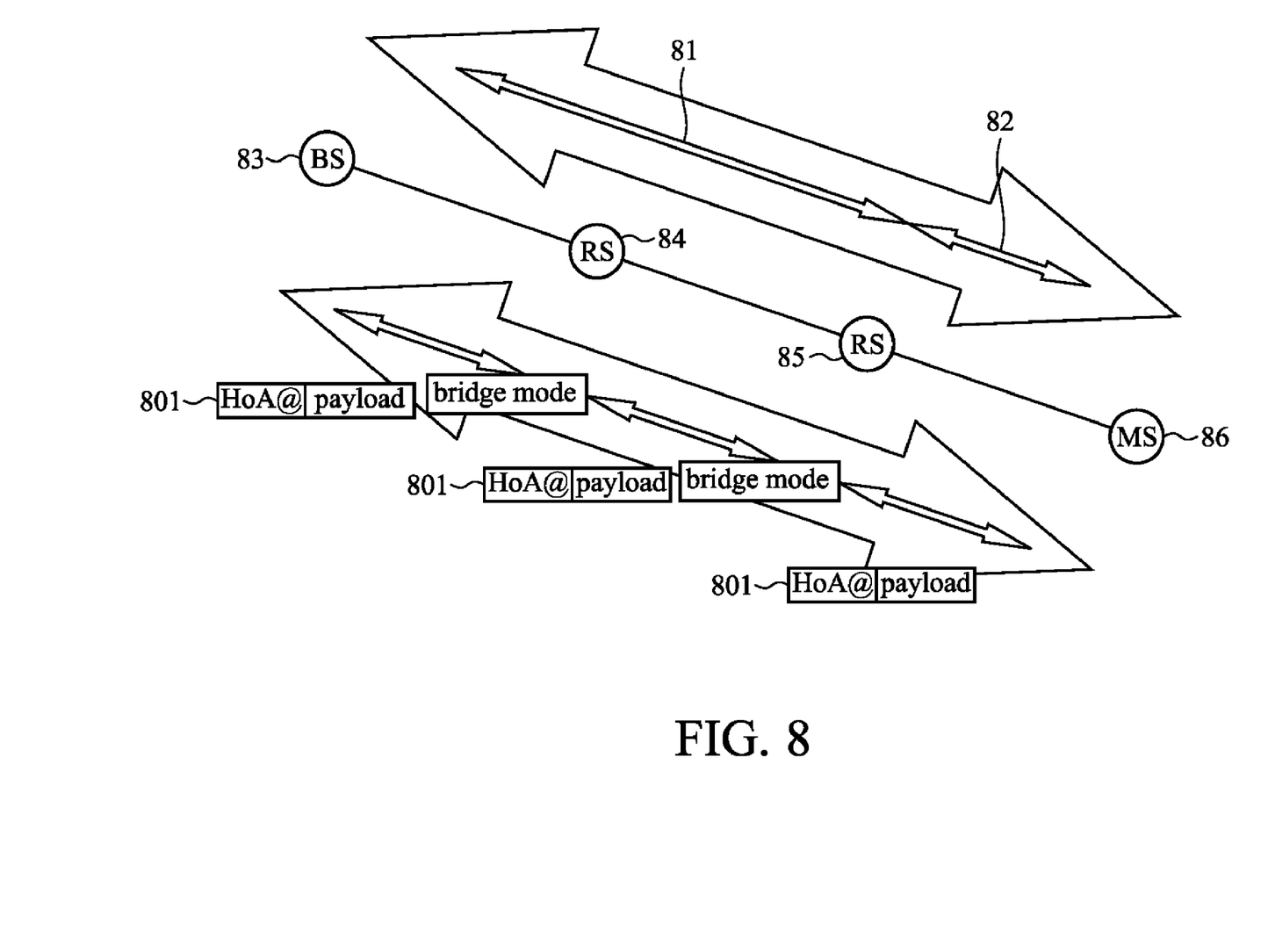
FIG. 8 is a schematic diagram of a multi-hop wireless communication system according to an exemplary embodiment consistent with the invention.

FIG. 8 is a schematic diagram of a multi-hop wireless communication system according to an exemplary embodiment consistent with the invention. The embodiment is illustrated by using two relay stations, a first relay station 84 and a second relay station 85, but is not limited thereto. Due to the distance between the mobile station 86 and the base station 83, the first relay station 84 and second relay station 85 are required to transfer the control packet and data packet between the mobile station 86 and the base station 83. When transmitting the control packet to the base station 83, the control packet is first transmitted to the second relay station 85 via the wireless network 82 complying with the 802.16 standards. Then, the control packet is transmitted to the base station 83 via a described tunneling mode 81. In this embodiment, the network between the first relay station 84 and the second relay station 85 may be a local area network (LAN) or wireless network, and the network between the first relay station and the base station 83 may be a local area network (LAN) or wireless network.

When the mobile station 86 transmits the data packet to the base station 83, the data packet is first transmitted to the second relay station 85. The second relay station 85 transmits the data packet first relay station 84 via the bridge mode and the first relay station 84 then transmits the data packet to the base station 83.

Figure 9:
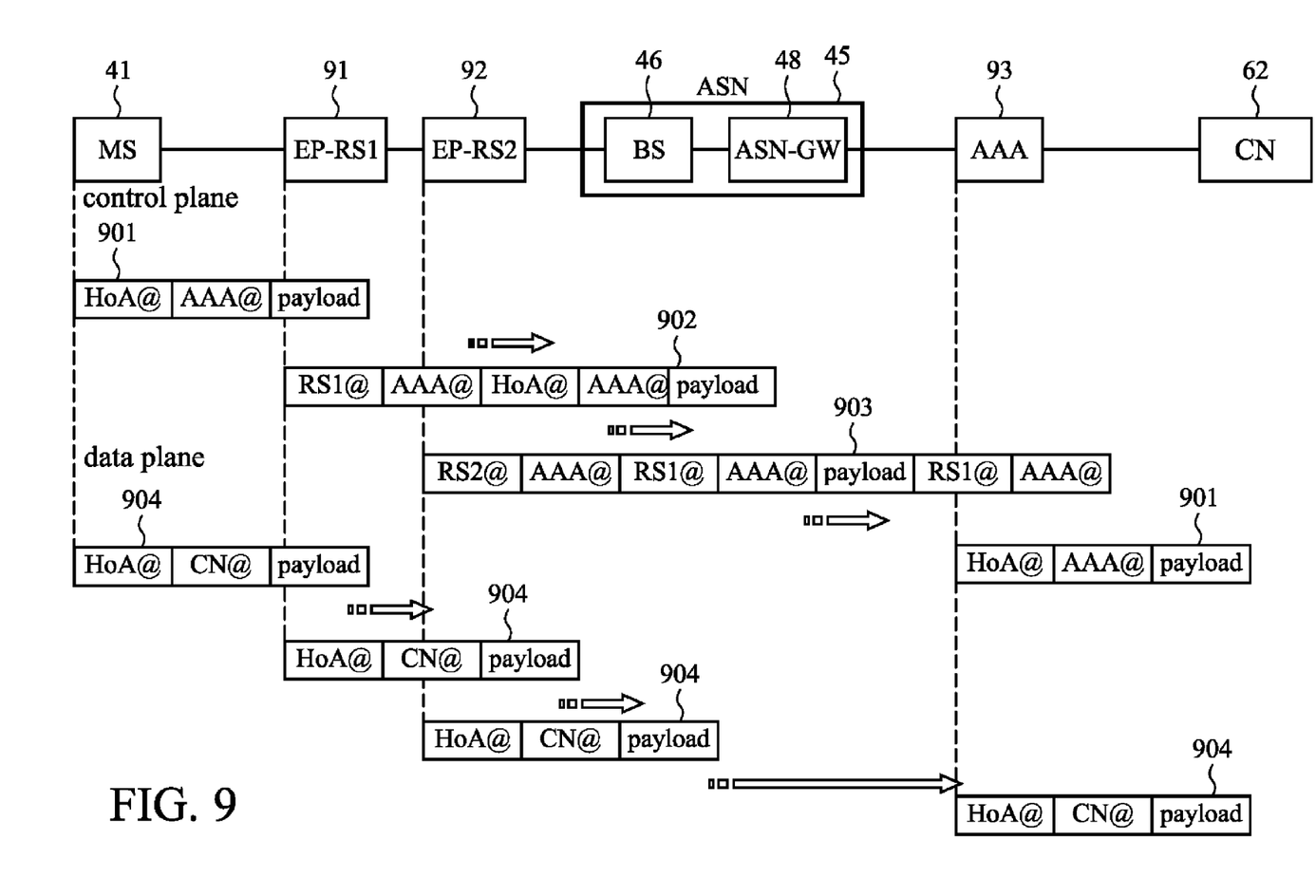
FIG. 9 is a schematic diagram showing the transformation of a packet in a multi-hop wireless communication system according to an exemplary embodiment consistent with the invention.

FIG. 9 is a schematic diagram of the packet transformation in a multi-hop wireless communication system according to an exemplary embodiment consistent with the invention. The source address of the control packet 901 is the address of the mobile station 41, HoA@, the destination address of the control packet is the address of the corresponding node, AAA@, and the content of the data packet transmitted is a payload. When the first EP-RS 91 receives the control packet 901, the first EP-RS 91 adds the address of the first EP-RS 91, the RS1@, and the address of corresponding node 62, AAA@, to the control packet 901 to generate a control packet 902 to indicate that the control packet 902 has been authenticated by the first EP-RS 91, and wants to be transmitted to the corresponding node 62.

When the second EP-RS 92 receives the control packet 902, the second EP-RS 92 adds the address of the second EP-RS 92, RS2@, and the address of the corresponding node (CN) 62, AAA@, to the control packet 902 to generate a control packet 903 to indicate that the control packet 903 has been authenticated by the second EP-RS 92, and wants to be transmitted to the corresponding node 62.

When the AAA module 93 receives the control packet 903, the AAA module 93 removes the addresses of the first EP-RS 91 and the second EP-RS 92, the RS1@ and the RS2@, from the control packet 903 to return the control packet 903 to the original control packet 901 issued by the mobile station 41.

When the mobile station 41 transmits the data packet to the corresponding node 62, the first EP-RS 91 transmits the data packet to the second EP-RS 92 via a bridge mode, wherein the corresponding node 62 may be the node or computers in the internet, and the bridge mode may be a transmission path, a transmission control unit or a transmission module in the EP-RS. In this embodiment, the bridge mode only indicates a transmission method in the first EP-RS 91 and can be implemented by a BS module with the ASN-GW, and the bridge controller does not have to be embedded in the first EP-RS 91. The source address of the data packet 904 is the address of the mobile station 41, HOA@, the address of the destination is the address of the corresponding 62, CN@, and the content of the transmitted data ("data" in FIG. 9). Since the first EP-RS 91 operates under a bridge mode, the first EP-RS 91 directly transmits the data packet 904 to the second EP-RS 92.

The operation of the second EP-RS 92 is similar to the first EP-RS 91, and the second EP-RS 92 directly transmits the data packet 904 to the AAA module 93. Since the mobile station 41 has been authenticated, the data packet 904 is transmitted to the corresponding node 62 according to the address of destination, CN@.

The embodiment is illustrated by only using the transmission of the data packet and control packet from the mobile station 41 to the corresponding node 62, however other transmission relationships may be derived by those skilled in the art.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A relay station for a base station and a mobile station, comprising:
    a first base station module configured to receive a control packet and a data packet transmitted by the mobile station; and
    a mobile station module configured to receive the control packet and the data packet from the first base station module and transmit the control packet and the data packet to the base station, wherein the first base station module is configured to transmit the control packet to the mobile station module via a tunnel mode, and transmit the data packet to the mobile station module via a bridge mode.

2. The station as claimed in claim 1, wherein the first base station module comprises:
    a base station module; and
    an access service network gateway.

3. The station as claimed in claim 2, wherein the base station module is configured to determine a service flow according to the mobile station.

4. The station as claimed in claim 2, wherein the access service network gateway is configured to authenticate the mobile station.

5. The station as claimed in claim 1, wherein the first base station module is configured to apply an authentication procedure, a network bill procedure or a network usage time-counting procedure.

6. The station as claimed in claim 1, further comprising a tunnel/dispatch unit coupled between the first base station module and the mobile station module and configured to add the address of the relay station to the control packet when the tunnel/dispatch unit receives the control packet.

7. The station as claimed in claim 1, further comprising a tunnel/dispatch unit coupled between the first base station module and the mobile station module and configured to remove the address of the relay station from a first control packet which is transmitted to the mobile station to generate and transmit a second control packet to the mobile station while the mobile station module receives the first control packet.

8. The station as claimed in claim 7, wherein the tunnel/dispatch unit comprises a table for corresponding the mobile station with the relay station and for recording the addresses of the relay station and the mobile station which is connected to the relay station.

9. The station as claimed in claim 1, wherein
the first base station module is configured to communicate with the mobile station via a first network that conforms to a first wireless network standard, and
the mobile station module is configured to communicate with the base station via a second network that conforms to a second wireless network standard.

10. The station as claimed in claim 9, wherein the first wireless network standard is IEEE 802.16j standard.

11. The station as claimed in claim 9, wherein the first wireless network standard is different from the second wireless network standard.

12. A wireless communication system, comprising:
a mobile station;
an access service network server;
a tunnel/dispatch unit;
a base station connected to the access service network server; and
a relay station, comprising:
a first base station module configured to receive a control packet and a data packet transmitted by the mobile station; and
a mobile station module configured to receive and transmit the control packet and the data packet to the base station,
wherein
the first base station module is configured to transform the control packet into a first control packet and transmit the first control packet to the mobile station module via a tunnel mode,
the first base station module is configured to transmit the data packet to the mobile station module via a bridge mode, and
the tunnel/dispatch unit is configured to, upon receipt of the first control packet, transform the first control packet into the control packet, and transmit the control packet to the access service network server.

13. The system as claimed in claim 12, wherein the first base station module comprises:
a base station module; and
an access service network gateway.

14. The system as claimed in claim 13, wherein the base station module is configured to determine a service flow according to the mobile station.

15. The system as claimed in claim 13, wherein the access service network gateway is configured to authenticate the mobile station.

16. The system as claimed in claim 12, wherein the first base station module is configured to apply an authentication procedure, a network bill procedure or a network usage time-counting procedure.

17. The system as claimed in claim 12, wherein the tunnel/dispatch unit is a second tunnel/dispatch unit, and the relay station further comprises a first tunnel/dispatch unit coupled between the first base station module and the mobile station module and configured to generate the first control packet.

18. The system as claimed in claim 17, wherein the first tunnel/dispatch unit is configured to add the address of the relay station to the control packet to generate the first control packet.

19. The system as claimed in claim 17, wherein when the mobile station module receives a second control packet transmitted from the base station, the first tunnel/dispatch unit is configured to remove the address of the relay station from the second control packet to generate a third control packet to be transmitted to the mobile station by the first base station module.

20. The system as claimed in claim 12, wherein the tunnel/dispatch unit comprises a table for corresponding the mobile station with the relay station and for recording records the addresses of the relay station and the mobile station which is connected to the relay station.

21. The system as claimed in claim 12, further comprising:
a first network which connects the mobile station and the first base station module and which conforms to a first wireless network standard, and
a second network which connects the mobile station module and the base station and which conforms to a second wireless network standard.

22. The system as claimed in claim 21, wherein the first wireless network standard is IEEE 802.16j standard.

23. The system as claimed in claim 21, wherein the first wireless network standard is different from the second wireless network standard.

24. The system as claimed in claim 12, wherein the relay station is a first relay station, and the system further comprises a second relay station comprising:
a second base station module configured to receive the first control packet and the data packet from the first relay station; and
a second mobile station module configured to receive and transmit the control packet and the data packet to the base station,
wherein the second base station module is configured to transform the first control packet into a second control packet and transmit the second control packet to the second mobile station module via the tunnel mode, and
the second base station module is configured to transmit the data packet to the second mobile station module via the bridge mode.

25. The system as claimed in claim 24, wherein the tunnel/dispatch unit is configured to, upon receipt of the second control packet, transform the second control packet into the control packet, and transmit the control packet to the access service network server.

26. The system as claimed in claim 25, wherein the tunnel/dispatch unit is configured to remove the addresses of the first relay station and the second relay station from the second control packet to generate the control packet.

27. The system as claimed in claim 24, wherein the second base station module is configured to add the address of the second relay station to the first control packet to generate the second control packet.

28. A wireless communication method, comprising:
applying a network entry procedure at a relay station when the relay station connects to an access service network module via a network;
authenticating a mobile station by the relay station, and establishing a network connection between the mobile station and the relay station;
wherein when the mobile station transmits a control packet to the access service network module, the relay station operates in a tunnel mode, and transmits a first control packet to the access service network module after the control packet is transformed into the first control packet; and
when the mobile station transmits a data packet to the access service network module, the relay station operates in a bridge mode to directly transmit the data packet to the access service network module.

29. The method as claimed in claim 28, further comprising:
adding the address of the relay station to the control packet to generate the first control packet.

30. The method as claimed in claim 28, further comprising:
removing, by a tunnel/dispatch unit of the access service network module, the address of the relay station from the first control packet when the tunnel/dispatch unit receives the first control packet.

31. The method as claimed in claim 28, wherein the relay station is a first relay station, and the method further comprises:
establishing a network connection between the first relay station and a second relay station;
transforming the first control packet into a second control packet and transmitting the second control packet to the access service network module when the second relay station receives the first control packet from the first relay station; and
transforming the second control packet into the control packet by a tunnel/dispatch unit and transmitting the control packet to the access service network module.

32. The method as claimed in claim 31, further comprising:
adding the address of the second relay station to the first control packet to generate the second control packet.

33. The method as claimed in claim 31, wherein when the tunnel/dispatch unit receives the second control packet, the tunnel/dispatch unit removes the addresses of the first relay station and the second relay station from the second control packet to generate the control packet.

* * * * *